United States Patent [19]

Irwin

[11] Patent Number: 4,534,272

[45] Date of Patent: Aug. 13, 1985

[54] LOW INERTIA AND LOW FRICTION ROTATING CYLINDER ENGINE

[75] Inventor: Everett F. Irwin, Dunedin, Fla.

[73] Assignee: Dynacycle Corporation, Dunedin, Fla.

[21] Appl. No.: 676,880

[22] Filed: Nov. 30, 1984

[51] Int. Cl.³ ........................ F01B 13/06; F16H 25/08

[52] U.S. Cl. ........................ 91/493; 74/55

[58] Field of Search ........................ 91/491–495; 92/58, 72, 148; 417/273, 534; 123/44 R; 74/55, 49

[56] References Cited

U.S. PATENT DOCUMENTS

| | | | |
|---|---|---|---|
| 426,003 | 4/1980 | Farmer | 91/493 |
| 1,135,414 | 4/1915 | Vincent | 91/491 X |
| 1,867,470 | 7/1932 | Ponthieu | 417/273 X |
| 2,045,330 | 6/1936 | MacMillin | 91/493 |
| 2,312,057 | 2/1943 | Williams | 74/49 |
| 3,092,037 | 6/1963 | Rhodes | 417/273 |
| 3,093,301 | 6/1963 | Mitchell | 417/273 |
| 3,834,840 | 9/1974 | Hartley | 417/535 |
| 4,080,107 | 3/1978 | Ferrentino | 417/273 X |
| 4,413,486 | 11/1983 | Irwin | 91/493 X |

FOREIGN PATENT DOCUMENTS

| | | | |
|---|---|---|---|
| 831359 | 2/1952 | Fed. Rep. of Germany | 91/481 |
| 2265118 | 6/1976 | Fed. Rep. of Germany | 91/491 |
| 3040445 | 5/1982 | Fed. Rep. of Germany | 417/273 |
| 64313 | 5/1913 | Switzerland | 91/493 |
| 684394 | 12/1952 | United Kingdom | 74/55 |

*Primary Examiner*—William L. Freeh
*Assistant Examiner*—Paul F. Neils
*Attorney, Agent, or Firm*—Ronald E. Smith; Harold D. Shall

[57] ABSTRACT

A rotating cylinder engine having a stationary housing surrounding a rotating cylinder block, which cylinder block rotates unitarily but eccentrically with an output shaft. The housing rotatably mounts both the shaft and the cylinder block. The cylinder block has four equally spaced cylinders therein with each cylinder reciprocally receiving therein a piston. The inner ends of each piston are equipped with abutting surfaces and a roller arrangement is mounted cooperatively with each piston and for unitary rotation with the output shaft. The rollers engage the inner end of the abutting surface on the piston to facilitate relative translatory movement between the pistons and the output shaft which occur during eccentric movement of the cylinder block and the output shaft while transfering driving force between the piston and the output shaft. Passage means in the housing allows pressure fluid therein to flow from a source external of the housing to impose driving loads upon the pistons. Bridal rings join oppositely disposed pistons to position them against the rollers and insure that the opposed pistons move conjointly.

8 Claims, 20 Drawing Figures

LOW INERTIA AND LOW FRICTION ROTATING CYLINDER ENGINE

BACKGROUND OF THE INVENTION

1. Field of the Invention

This invention relates generally to rotating cylinder engines of the fluid displacement type and more particularly to improvements in rotary engines of the radial piston type which improvements result in a compact device which has a reduction of inertia and friction and an improvement in efficiency.

2. Description of the Prior Art

Many types and configurations of rotary cylinder engines have been developed in an attempt to arrive at devices which have long life and operate efficiently and quietly.

The instant invention is directed to providing a novel method of mounting the radially movable pistons in the member reciprocally mounting the same and also to a novel method of joining the piston to the shaft driven thereby all to provide for low friction, long life, and increased efficiency.

In French Pat. No. 2,311,183, "T" slots join the piston to the crankshaft which does not provide for reduced friction nor reduced inertia of the piston. U.S. Pat. No. 2,045,330 has flat planar surfaces on its eccentric member against which flat planar surfaces on the piston slide with relatively high friction.

U.S. Pat. No. 4,080,107 discloses rollers to eliminate sliding friction between the base of the piston and the rotating element driven by the pistons; however, the rollers are on the top of the rotating element and not depressed therein to reduce the inertial radius, and neither are adequate means present to control the position of the rollers, nor is there an attempt to provide a compact low inertia device.

In recently issued U.S. Pat. No. 4,413,486, rollers are utilized between the reciprocating piston and the eccentric shaft; however, again, the structure thereof does not result in a compact low inertia device.

SUMMARY OF THE INVENTION

In the first embodiment of this invention, the engine includes a stationary housing having a cylidrical bore therein which rotatably mounts therein a cylinder block. The block has two pairs of radially extending cylinders therein, with the paired cylinders being diametrically opposed, and each cylinder receiving therein a double acting piston for radial reciprocal movement in a sealed relationship. Diametrically opposed pistons are connected by bridle rings for unitary movement. The outer and inner ends of the cylinders are sealed and the pistons include an extension which extends through the inner cylinder seal to be drivingly connected to the output shaft. The central portion of the cylinder block is hollow and a driven shaft extends axially therethrough and is mounted for rotation in the stationary housing with the axis of rotation of the shaft being displaced from the axis of rotation of the block in an eccentric manner.

One of the end walls of the housing has a pair of diametrically opposed intake ports and a pair of diametrically opposed exhaust ports; one exhaust port and one intake port being positioned at a diametric point to operate on the outer end of the pistons and the other exhaust port and intake port being adapted to operate on the inner end of the pistons; such intake ports being one hundred eighty (180) degrees from each other and the exhaust ports being one hundred eighty (180) degrees from each other. The cylinder block adjacent each cylinder therein has a pair of axially extending openings therein adapted to cooperate with the intake and exhaust ports, with one being at the top of the cylinder and the other being at the bottom of the cylinder. As the cylinder block rotates, the various ports become aligned alternately with the cooperatively disposed opening in the cylinder block to provide access for pressure fluid, such as Freon, from the external source to an operative position above or below the double acting pistons.

The eccentric driven shaft has an enlarged central portion, which is rectangular in cross section, and at the axially extending edges thereof has semi-cylindrical recesses therein; in which recesses are rotatably mounted rollers which only partially project from the central portion sufficiently to rollingly engage the piston extensions and cooperate therewith. A pin arrangement secures each roller to the central portion for relative rotation about an axis which is parallel to the axis of the driven shaft. By being disposed substantially within the enlarged central portion, the inertia of the rollers is part of the driven shaft and not part of the pistons, thereby greatly reducing the inertia of the pistons and driven shaft and providing for a compact structure.

In the second embodiment of this invention, the cylinders in the cylinder block have outwardly open ends and are only single acting; the piston within each cylinder extending radially inwardly and has an abutting surface which engages rollers carried by an enlarged central portion of the driven shaft. Only a portion of the rollers project circumferentially from the enlarged central portion sufficiently to engage the abutting surface of the adjacent piston. A pin arangement secures each roller to the driven shaft. An intake port is disposed in the housing as is an output port; such output port being extended by a circumferentially extending groove.

The engines are constructed to be driven by pressure fluid from an external source, for example, pressurized Freon. The circuit of the Freon external of the engine is not shown. Freon leaves the engine through the exhaust ports as a gas, passes through a cooling condensor where it is liquified, then through a pump where it is pressurized to about one hundred eighty (180) PSI, then to a heating expansion chamber where the Freon is heated and expanded but its pressure maintained at about one hundred eighty (180) PSI. From the expansion chamber, the Freon is conducted to the inlet ports of the rotary engine. Suitable controls in the Freon circuit external of the engine govern the operation of the engine. The Freon has a conventional supply of lubricating oil therein to lubricate and seal the various engine components.

It is an object of this invention to provide an improved rotary cylinder engine for use such as an engine driven by an external source of pressure fluid, such as a freon engine or an external combustion engine, which can also be used as a fluid pump/motor, gas compressor or a vacuum pump and with minor modifications as an internal combustion engine.

A principal object of this invention is to provide such a device of the radial piston type having an eccentric driven shaft which device is compact and has a low inertia and low friction connection between the pistons and the driven shaft.

The invention accordingly comprises the combination of elements, features of construction, and arrangement of parts that will be exemplified in the constructions hereinafter set forth, and the scope of the invention will be indicated in the claims.

BRIEF DESCRIPTION OF THE DRAWINGS

For a fuller understanding of the nature and objects of this invention, reference should be made to the following detailed description, taken in connection with the accompanying drawings, in which.

DETAILED DESCRIPTION OF THE PREFERRED EMBODIMENT

Figure 1:
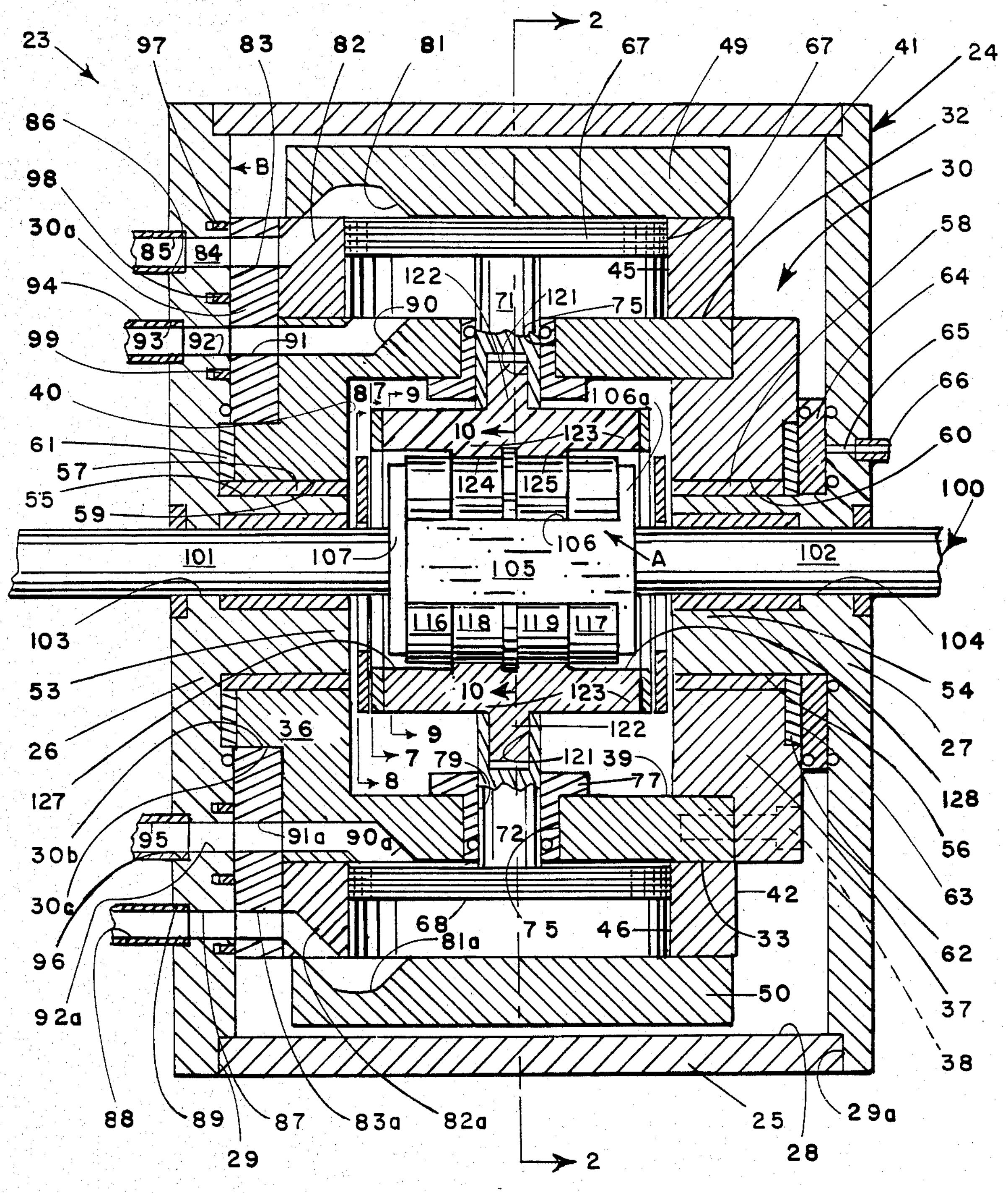
FIG. 1 is a longitudinal cross section view of this invention with certain parts shown in elevation and with the inlet and exhaust ports in the housing shown out of their normal position for explanation purposes and with certain portions shown in full lines.

In the embodiment of this invention shown in FIGS. 1-13, there is provided an engine 23 having a stationary engine housing 24. The housing 24 is made of three pieces, a cylindrical center portion 25 and, as seen in FIG. 1, a left and a right annular end wall 26 and 27 respectively, which collectively define a cylindrical bore 28. The left and right end walls 26 and 27 are conventionally secured to the center section 25 as by a plurality of bolts (not shown); there being an annular groove 29 formed in the left end wall and an annular groove 29*a* formed in the right end wall which securely and sealingly receive the center section 25.

Figure 2:
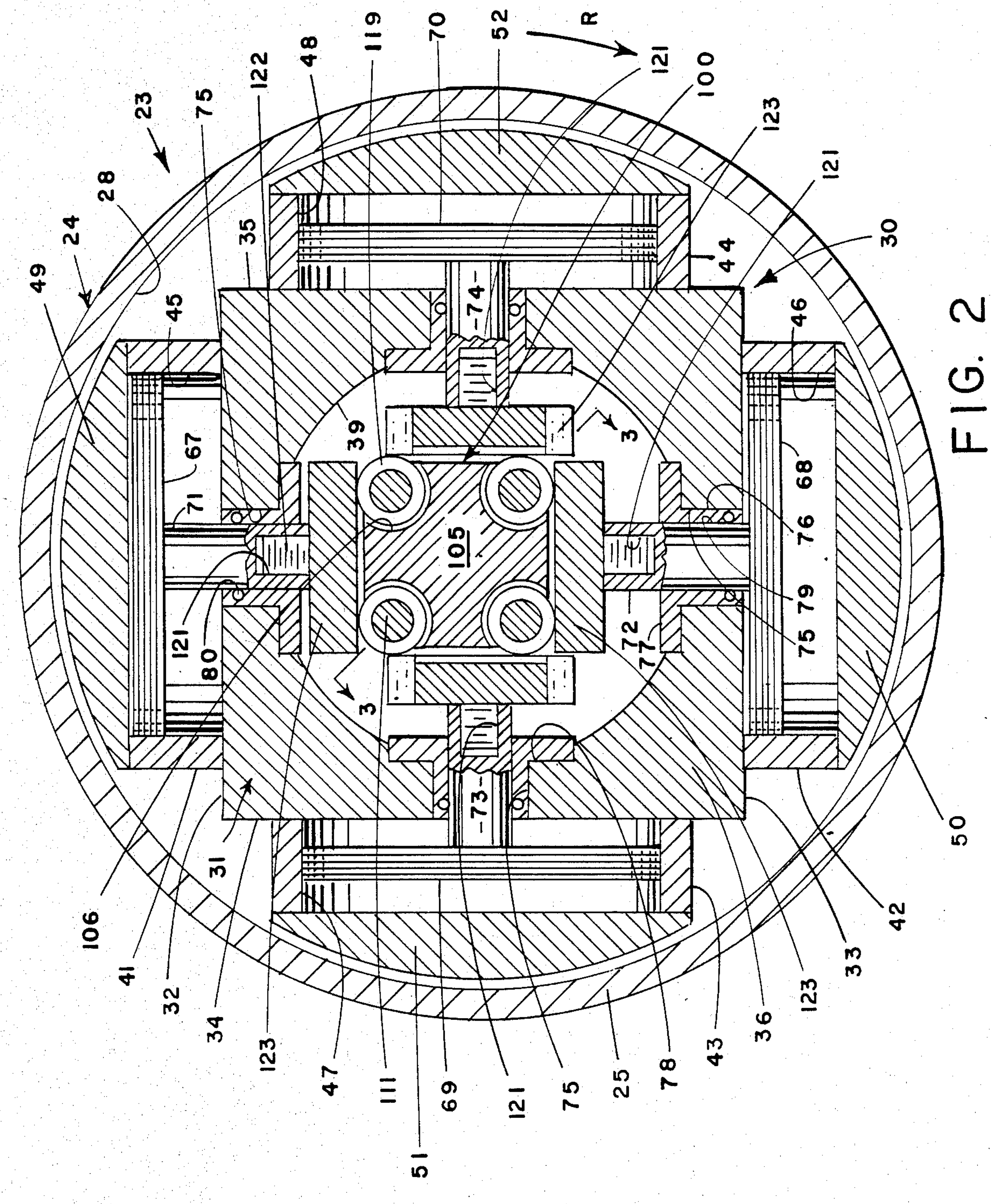
FIG. 2 is a cross sectional view taken substantially on the line 2—2 of FIG. 1, with certain portions shown in full lines.

A multiple component cylinder block 30 is rotatably mounted within the stationary housing 24. More particularly, as seen in FIG. 2, the cylinder block 30 has a center portion 31 which is square when viewed in transverse cross section having, as seen in FIG. 2, an upper and lower flat surface 32 and 33, respectively, and a left and right flat surface 34 and 35. As seen in FIG. 1, the center portion 31 is made of a left portion 36 and right portion 37 suitably bolted together as by a plurality of bolts, one of which is shown at 38. The left portion 36 is of hollow concave configuration and has a central bore 39, which is closed on the left side by an end wall 40 and is closed on its right side by the right portion 37. The cylindrical block 30 has secured to the flat surfaces 31, 32, 33 at 34 thereof, a piston receiving cylinder 41, 42, 43 and 44, respectively, with each having a rectangular external configuration and a cylindrical radially extending piston receiving bore 45, 46, 47 and 48, respectively; such cylinders 41, 42, 43 and 44 being each suitably secured to the flat surfaces 31-34 by a plurality of bolts (not shown) and the outer end of each cylinder being sealed by an end cap 49, 50, 51 and 52, respectively. The end caps 49-52 are suitably secured to the cylinders 41-44 by a plurality of bolts (not shown) and the end caps, when viewed in transverse cross section as seen in FIG. 2, have an external configuration which is arcuate and forms the portion of a cylinder so as to be rotatable within the cylindrical bore 28, while when viewed in longitudinal cross section as seen on FIG. 1, the external surface of the end caps are longitudinally parallel to the bore 28. Thus the four (4) end caps form segments of a cylinder slightly smaller than the cylindrical bore 28. The left side of the cylinder block 30 as seen in FIG. 1, has a flange 30*a* secured thereto, as by a plurality of bolts (not shown); the periphery of the flange 30*a* being round and co-terminus with the central peripheries of the cylinders 41, 42, 43 and 44. The flange 30*a* has an annular bore 30*b* received on an annular shoulder 30*c* projecting to the left from the main body of the left portion 36.

The cylinder block 30 is thus seen to be made from the central portion 31 (which in turn is made of portions 36, 37 and 30*a*), the cylinders 41-44 and the end caps 49-52.

The left 26 and right 27 end walls have extending inwardly therefrom annular bosses 53 and 54 respectively, which bosses have a cylindrical periphery 55 and 56 respectively, which is coaxial with the cylindrical bore 28 in the housing 24. Annular bearings 57 and 58 (made of a suitable low friction material such as Teflon) are respectively mounted on the cylindrical peripheries 55 and 56 and rotatably mounted on the bearings 57 and 58 is the cylinder block 30 by means of a bore 59 formed centrally in the left portion 36 and receiving the bearing 57 and a bore 60 in right portion 37 received on the bearing 58. An annular end thrust bearing 61 disposed to the left of the block 30 provides for low friction engagement between the left portion 36 and the end wall 26 and thereby between the cylinder block 30 and the left end wall.

An annular end thrust bearing 62 disposed in a counterbore 63 in the right portion 37 of the block 30 is engageable with an annular thrust bearing 64 disposed about the boss 54 and in engagement with the left inner face of the right end wall 27 (as seen in FIG. 1) provide for low friction engagement therebetween. An axially extending opening 65 is formed confluently in the thrust bearing 64 and the right end wall 27, which opening is connected to a conduit 66 carried by the left end wall 27. The conduit 66 is connected to a source of fluid pressure (such as Freon) which reacts against the thrust washer 62 and which in turn biases the cylinder block 30 to the left, as seen in FIG. 1, to assist in providing a seal as more fully hereinafter described.

Disposed in the piston receiving bores 45–48 are the pistons 67, 68, 69 and 70; since all of the pistons, except for the inner end thereof, are substantially the same, only one will be described in detail; however the inner ends will be more completely described later herein.

The pistons 66–70 are adapted for radial reciprocal movement within the bores 45–48 of the cylinders 41–44 respectively, and each piston 67–70 has extending radially inwardly therefrom a piston rod 71, 72, 73 and 74 respectively.

Located centrally in each of the flat surfaces 32, 33, 34 and 35 is a radially extending bore 75, with each bore having a cylindrical bushing 76 securely pressed therein in a sealed relationship; each bushing 76 having an annular flange 77 at the radially inner end thereof sealingly and securedly received in a counterbore 78 (see FIG. 2) formed in the bore 39 of the center portion of the cylinder block 30 surrounding each of the bores 75. Thus the bushings 76 when viewed in cross section are "T" shaped. Each of the cylindrical bushings 76 have a central radially extending bore 79 therein which bore firmly telescopically receives for relative reciprocal movement the piston rods 71, 72, 73 or 74 of the pistons 67–70 disposed adjacent the bushing; the fit being such as to allow such telescoping movement to take place while securely supporting the piston rod and the piston against rocking or tilting movement. Disposed in the bore 79 of each bushing 76 is an "O-ring" 80 to form a sliding seal between the bushing and the piston rod 71–74 received therein.

Each cylinder 45–48 is longer in a radial direction than the piston 67–70 received therein so that the piston may reciprocate radially therein. Refering to FIG. 1, reference is made to cylinder 41 and end cap 49 for explanation purposes; it being understood that the details of construction of cylinders 41–44 and end caps 49–52 are the same so that the explanation need not be repeated. Additionally, reference to directions such as "up" and "down" are made with reference to the cylinders being located in the position of the cylinder 45 in FIG. 1, unless otherwise indicated.

Extending upwardly and to the left in the end cap 49 is a concave first channel 81 which is formed in the portion of the end cap which overlies and is confluent with the left side of the bore 45 in the cylinder 41 and also overlies the adjacent wall of cylinder 41. A second annular channel 82 is formed in the end cap 49 and extends from the top of the wall of the cylinder 41 confluent with the first channel 81 and projecting downwardly to the left to be open at a location which is outside of the wall of cylinder 41 and is adjacent to the annular flange 30*a*. A third channel 83 extends laterally to the left through the annular flange 30*a*.

Several passageways are formed in the left end wall 26 and, in FIG. 1, are shown out of their normal positions for illustration purposes. These will now be explained with respect to FIG. 1 and then again explained with respect to FIG. 11 wherein such are in their operative position.

With respect to the cylinder 45, an intake port 84 is formed in the end wall 26 confluent with the third channel 83 and a supply tube 85 is securely pressed into and conventionally secured, as by bonding, in a counterbore 86 confluent with the port 84. The supply tube 85 is suitably connected to a source of pressurized working fluid (not shown) such as Freon. The Freon circuit external of the engine and the controls therefor to control the engine are also not shown.

With respect to the cylinder 46, the first, second and third channels 81*a*, 82*a* and 83*a* are shown confluent with an exhaust port 87 in the end wall 26 confluent with an exhaust tube 88 securely pressed into and conventionally secured as by bonding in a counterbore 89 confluent with the port 87.

With respect to the bore 45, a fourth passageway 90 is formed in the left portion 36 of the central portion 31 of the cylinder block 30 which passageway opens in the surface 32 just to the right of the left side of the cylinder 41 so as to be confluent with the bore 45. The passageway 90 extends to the left where it is confluent with a fifth passageway 91 which extends laterally to the left and through the annular flange 30*a*. With respect to the cylinder 45, a sixth or exhaust passageway 92 (in FIG. 1 being shown out of its actual position) is formed in the end wall 26 confluent with the passageway 91; the latter being confluent with an exhaust tube 94 securely pressed into and secured as by bonding in a counterbore 93 confluent with the bore 92.

With respect to the cylinder 46 a fourth and fifth channels 90*a* and 91*a* are shown confluent with a sixth or intake port 92*a* in the wall 26 confluent with an intake tube 95 secured in a counterbore 96 confluent with the port 92*a*.

The pistons 67–70 are double acting, so that when a port 81 or 81*a* above the piston is providing pressurized gas to the top thereof, the corresponding port 90 or 90*a* is venting gas from the bottom thereof and conversely. It should be noted that opposed pistons are charged in the opposite directions, so that, as seen in FIG. 1, when the upper chamber of the top piston is being charged, the lower chamber of the bottom piston is being exhausted and vice versa.

Three (3) annular sealing rings are carried in the end wall 26, an outer sealing ring 97 disposed immediately outwardly of the passages 83 and 83*a* is carried in the groove in the wall 26, an intermediate sealing ring 98 is disposed between the passageways 83 and 91 and between the passageways 83*a* and 91*a* and an inner sealing ring 99 is disposed inwardly of the passageways 91 and 91*a*. The sealing rings 97, 98 and 99 are sealingly disposed in mating annular grooves in the wall 26 and slidingly and sealingly engage the left wall of the annular flange 30*a*. The fluid pressure in the axial opening 65 in the right end wall 27 biases the cylinder block 30 to the left so that the sealing rings 97, 98 and 99 work effectively.

Referring to FIG. 2, the direction of rotation of the cylinder block 30 and output shaft 100 is shown by the arrow R.

Figure 11:
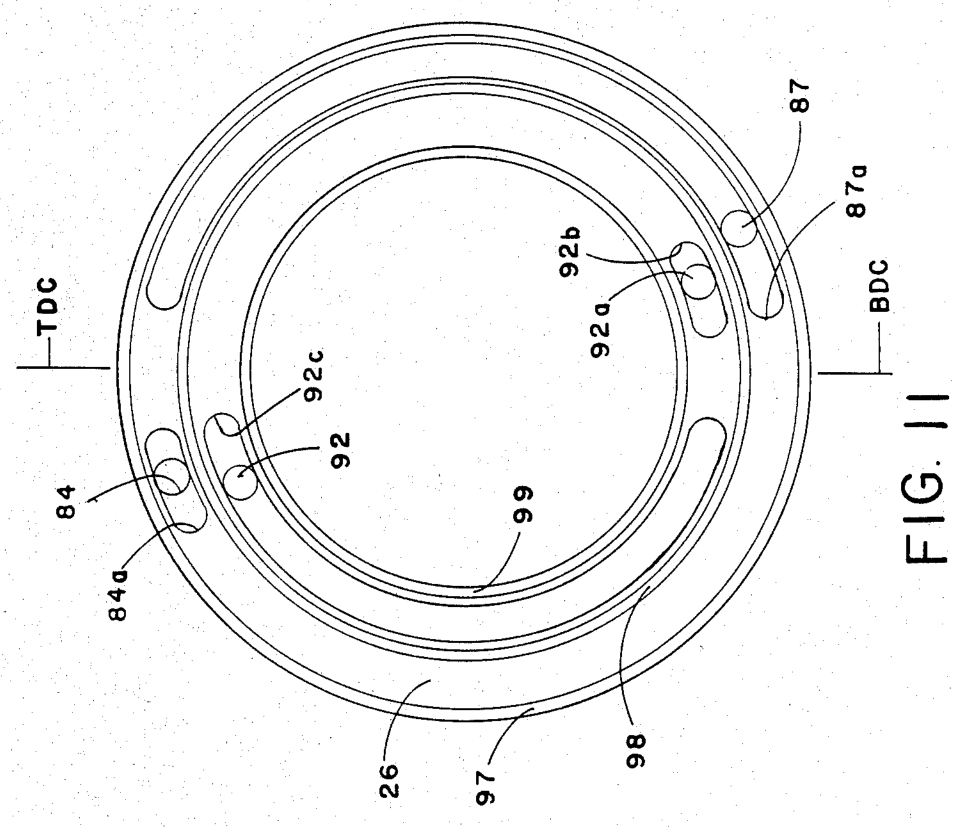
FIG. 11 is a view taken in the direction of the arrow B of a portion of an end plate of the housing between the inner and outer sealing rings therein to show the exhaust and intake ports.

Referring to FIG. 11, it is seen that the intake port 84 is slightly to the left of the top dead center (TDC) position and is extended slightly circumferentially in both directions by elongating groove 84*a*. Left of TDC is after the cylinder has passed TDC. Intake port 92*a* is slightly to the right of bottom dead center (BDC) and is extended slightly circumferentially in both directions by elongated groove 92*b*. The right of BDC is after the cylinder has passed BDC. Exhaust port 92 is slightly to the left of top dead center and is extended slightly clockwise and substantially counterclockwise by elongated groove 92*c*, while exhaust port 87 is slightly to the right of bottom dead center and is slightly counterclockwise and substantially clockwise by the elongated groove 87*a*.

Rotatably mounted in the housing 24 is an output shaft 100, which, as seen in FIG. 1, is made of a left 101 and a right 102 portion. More particularly, the end walls 26 and 27 are, respectively, provided with aligned axially extending bushed bores 103 and 104, with the axis of such bores, as seen in FIG. 1, being disposed above the axis of rotation of the cylinder block 30, so that the block and the shaft 100 rotate eccentrically, with the amount of offset between the axes controlling the amount of throw of the pistons 67–70.

Figure 3:
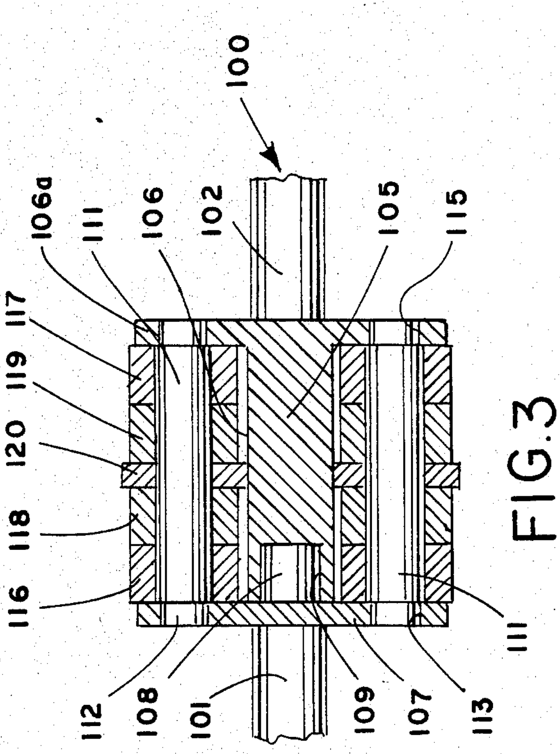
FIG. 3 is a cross sectional view of the center portion of the output shaft taken substantially on the line 3—3 in FIG. 2 with certain portions shown in full lines.

As seen in FIGS. 1, 2 and 3, the left or inner end 105 of the right portion 102, which is the center portion of the output shaft 100, is enlarged and generally of cube shape, as is apparent since in cross section in both FIGS. 1 and 2, (and also in FIG. 10), the inner end 105 appears generally square. Thus the inner end 105 is a square cam.

Figure 10:
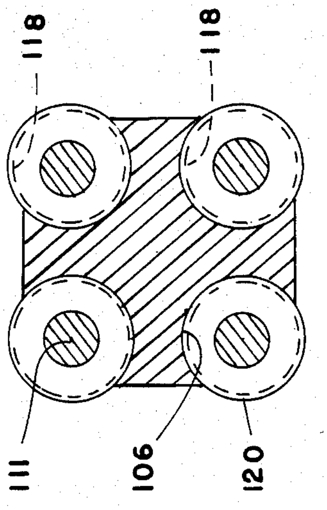
FIG. 10 is a cross sectional view taken along the lines 10—10 of FIG. 1 of only the driven shaft and certain members mounted thereon.

As seen in FIGS. 2 and 10, in each of the axially extending corners of the center portion 105 is a semicylindrical groove, one of which is indicated by the number 106; two (2) of the grooves can also be seen in each FIGS. 1 and 3. The grooves 106 do not extend for the full length of the center portion 105, as they terminate just short of the right end thereof to leave a shoulder 106*a* on the center portion to the right of each groove 106.

Figure 9:
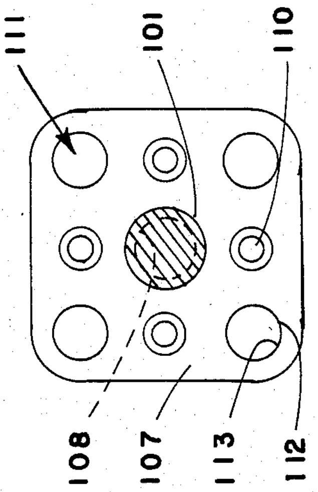
FIG. 9 is a cross sectional view taken along the lines 9—9 in FIG. 1 of only the driven shaft and certain members mounted thereon.
Figure 7:
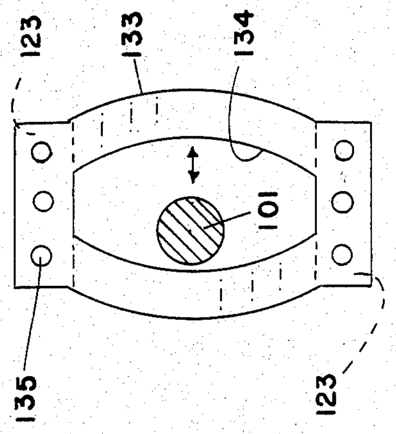
FIG. 7 is a view of one of the bridle rings when viewed along the lines 7—7 in FIG. 1.

The right or inner end of the left portion 101 of the output shaft has adjacent to its right end a square flange 107, as seen most clearly in FIG. 9, but also seen in FIGS. 1 and 3. As seen in FIGS. 3 and 9, a pilot 108 is formed on the very right end of the shaft 101 and is securely pilotingly fit into a bore 109 formed at the left end of the enlarged end 105. As seen in FIG. 9, four (4) bolts 110 secure the square flange to the enlarged end 105 at locations intermediate the semicylindrical grooves 106.

Disposed in each of the semicylindrical grooves 106 is a roll pin 111 of substantially less diameter than the groove, with the ends 112 of the pins being reduced in diameter; the left end 112 being received in openings 114 formed in the flange 107 and the right ends 114 being received in the openings 115 formed in the shoulder 106*a*.

Each of the roll pins 111 has four (4) rollers mounted thereon, a pair of outer rollers 116 and 117 being on the opposed outer ends (the roller 116 on the left end and the roller 117 on the right end) and a pair of inner rollers 118 and 119 with the roller 118 being the left inner roller immediately to the right of the roller 116 and the roller 119 being to the right of the inner roller and being immediately to the left of roller 117. A supporting washer 120 is mounted on the roll pin 111 between the rollers 118 and 119. As clearly seen in FIGS. 3 and 10, the rollers 116–119 are spaced from the botton of the grooves 106 and free to rotate on the roll pin 111. The washer 120 engages the bottom of the groove 106 and thereby supports the pin 111 and prevents the same from flexing inwardly under radially inward loads.

Figure 12:
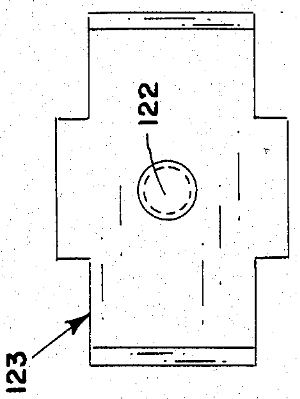
FIG. 12 is a view of one of the roller plates seen in FIGS. 1 and 5 when viewed in a direction opposite to the arrow A.
Figure 5:
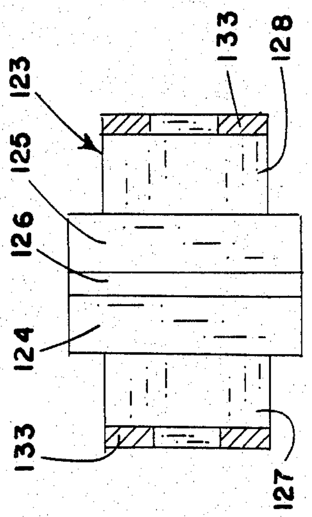
FIG. 5 is a view of one of the roller plates seen in FIG. 1 when viewed in direction of the arrow A, the other roller plate in FIG. 1 being identical but oppositely disposed.

Referring to FIGS. 1, 2 and 5, the piston rods 71 and 72 of the pistons 67 and 68 terminate at their inner end in a threaded aperture 121. Threadedly received in each of the apertures 121 of the rods 71 and 72 is the outwardly projecting threaded pin 122 of an inner roller plate 123. As seen in FIG. 12, the threaded pin is disposed centrally in the outer surface of the plate 123. As clearly seen in FIGS. 1 and 5, the inner roller plates 123 have raised central surfaces 124 and 125 respectively adapted to engage a pair of the left and right inner rollers 118 and 119; the central surfaces being spaced by a groove 126 which accommodates the washer 120, while the lateral surfaces 127 and 128 outwardly beyond the central surfaces 124 and 125 being spaced from the outer rollers 116 and 117.

Figure 4:
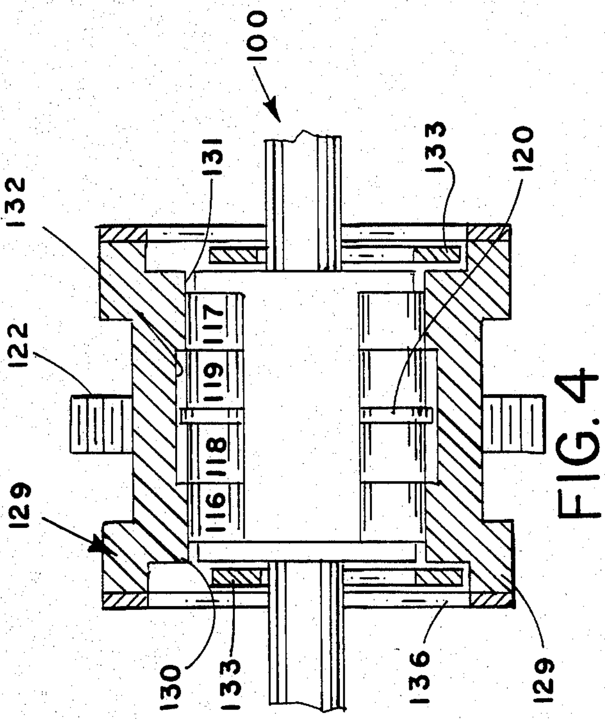
FIG. 4 is a longitudinal cross section view with certain parts shown in elevation of the center portion of the outer shaft and the cooperating roller plates when viewed ninety (90) degrees from the position shown in FIG. 1.
Figure 13:
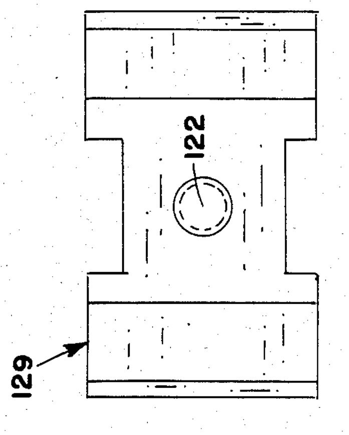
FIG. 13 is a view similar to FIG. 12 of a roller plate used in conjunction with a piston disposed ninety (90) degrees from the pistons shown in FIG. 1.
Figure 6:
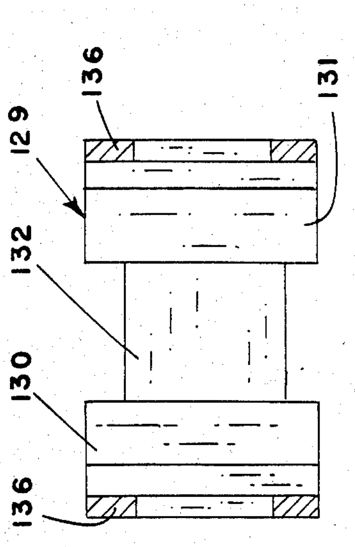
FIG. 6 is a view similar to FIG. 5 of a roller plate used in conjunction with a piston disposed ninety (90) degrees from the pistons shown in FIG. 1.

Referring now to FIG. 4 which shows the inner roller plates 129 disposed ninety (90) degrees from the inner roller plates 123 and to FIGS. 6 and 13 which shows details of such plate. In FIG. 13, it is seen that a threaded pin 122 is formed centrally in the radially outer surface of the plate 129, which pin, as seen in FIG. 2, is adapted to be threadedly received in the threaded opening 121 in the piston rods 73 and 74 of the pistons 69 and 70 respectively. The inner roller plates 129 as seen in FIGS. 4 and 6 have raised lateral surfaces, a left lateral surface 130 adapted to engage a pair of outer rollers 116 and a right lateral surface 131 adapted to engage a pair of outer rollers 117. The intermediate portion 132 of the inner roller plate 129 intermediate the left 130 and right 131 lateral surfaces is spaced radially outwardly from the inner rollers 118 and 119 and also from the washer 120.

As seen in FIGS. 1 and 4, each roller plate 123 and 129 engage a pair of rollers spaced axially on the roller pin and as seen in FIG. 2, each roller plate engages the rollers on a pair of roller pins, which rollers project in the same direction as the square cam 105.

Bridle rings are provided to secure opposed pistons together and provide for unitary reciprocal motion. More particularly, in FIG. 7 we see one (1) of the pair of inner bridle rings 133 which has a central aperture 134 to receive the output shaft portions 101 or 102. Referring to FIGS. 1, 4, 5 and 7 we see that the bridle rings 133 are secured to opposed lateral edges of the opposed inner roller plates 123 by a plurality of bolts 135 and are disposed just laterally outwardly of the flanges 107 and 106*a* on the central portion 105. The bridle ring 133 insures that pistons 67 and 68 move unitarily.

Figure 8:
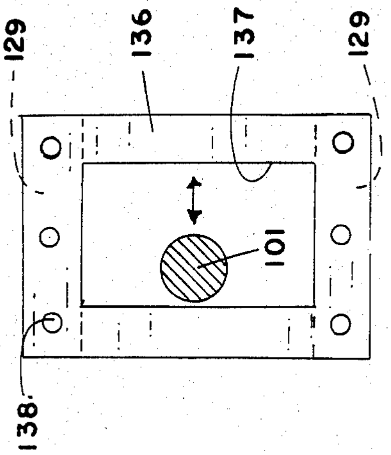
FIG. 8 is a view of the other bridal ring when viewed along the lines 8—8 in FIG. 1.

In FIG. 8 we see the outer bridle rings 136 having a central aperture 137 to receive the output shaft portions 101 or 102. Referring to FIGS. 1, 4, 6 and 8, we see that bridle rings 136 are secured to opposed lateral edges of the opposed inner roller plates 129 as by a plurality of bolts 138 and are disposed just laterally outwardly of the bridle rings 133. The bridle rings 136 insure that pistons 69 and 70 move unitarily. Thus, when the upper piston 67 is being forced downwardly (or inwardly) by fluid pressure above it, the lower piston 68 is being forced downwardly (or outwardly) by fluid pressure (as seen in FIG. 2) above it, both pistons then, because of the bridle ring 143, cause the inner plate 123 to impose a load on the square cam of the output shaft 100 which causes the output shaft 100 to rotate relatively to the housing 24 in a well known manner. The pistons 67, 68, and 70 and the block 30 rotate unitarily with the output shaft 100.

The rollers 116–119, by cooperatively rollingly engaging the inner and outer roller plates 123 and 129 allow the plates to move between their central position when the plates are disposed in the upward and downward position as seen in FIG. 2 to their lower position when the plates are in the left and right position as seen in FIG. 2. The rollers being associated with and secured to the cam and recessed therein provide for a low inertia, compact structure.

Reference is now made to the second embodiment of this invention, as seen in FIGS. 16–22.

Figure 16:
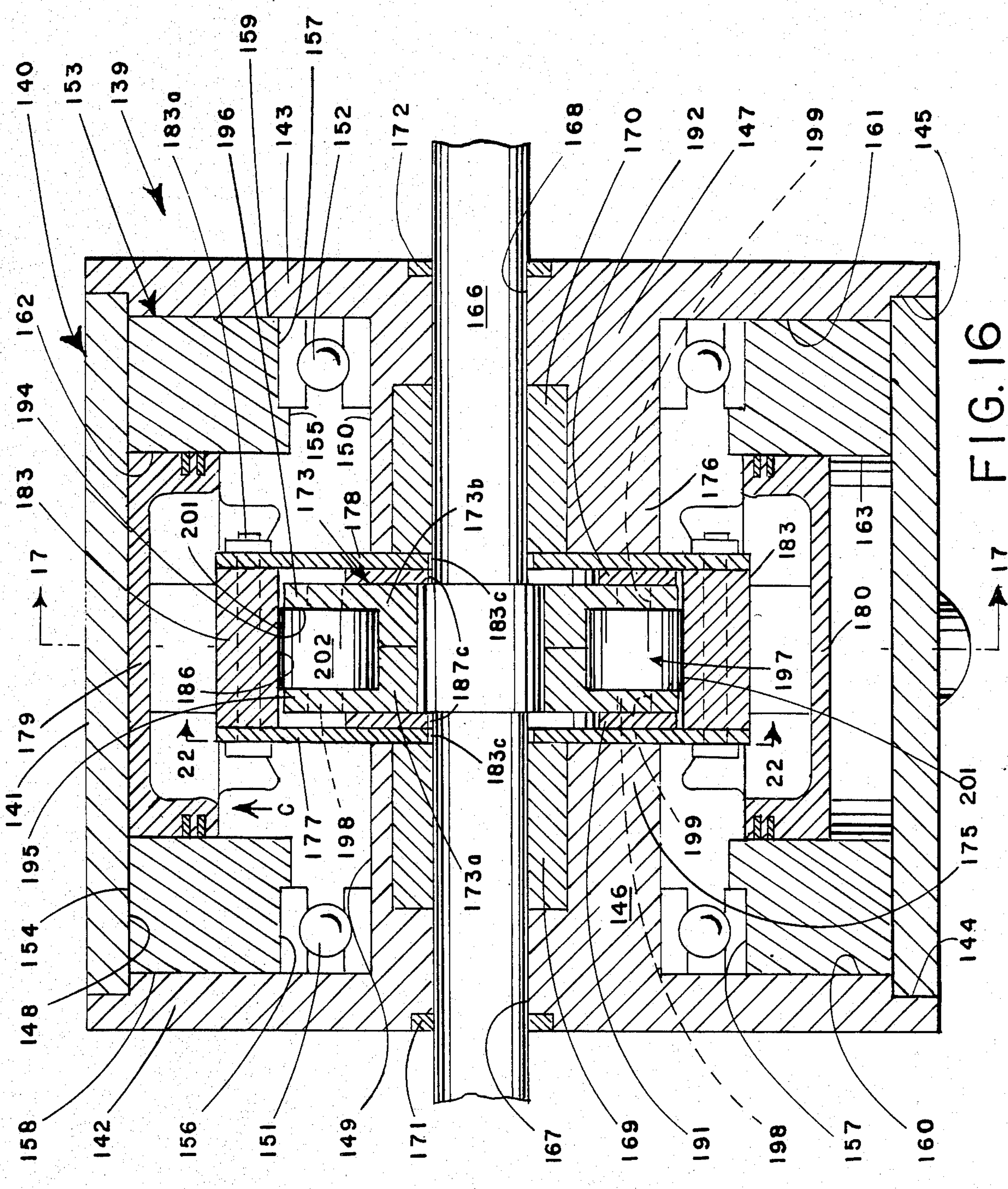
FIG. 16 is a longitudinal cross sectional view of a second embodiment of this invention taken along the line 16—16 of FIG. 17 with certain portions shown in full lines.
Figure 17:
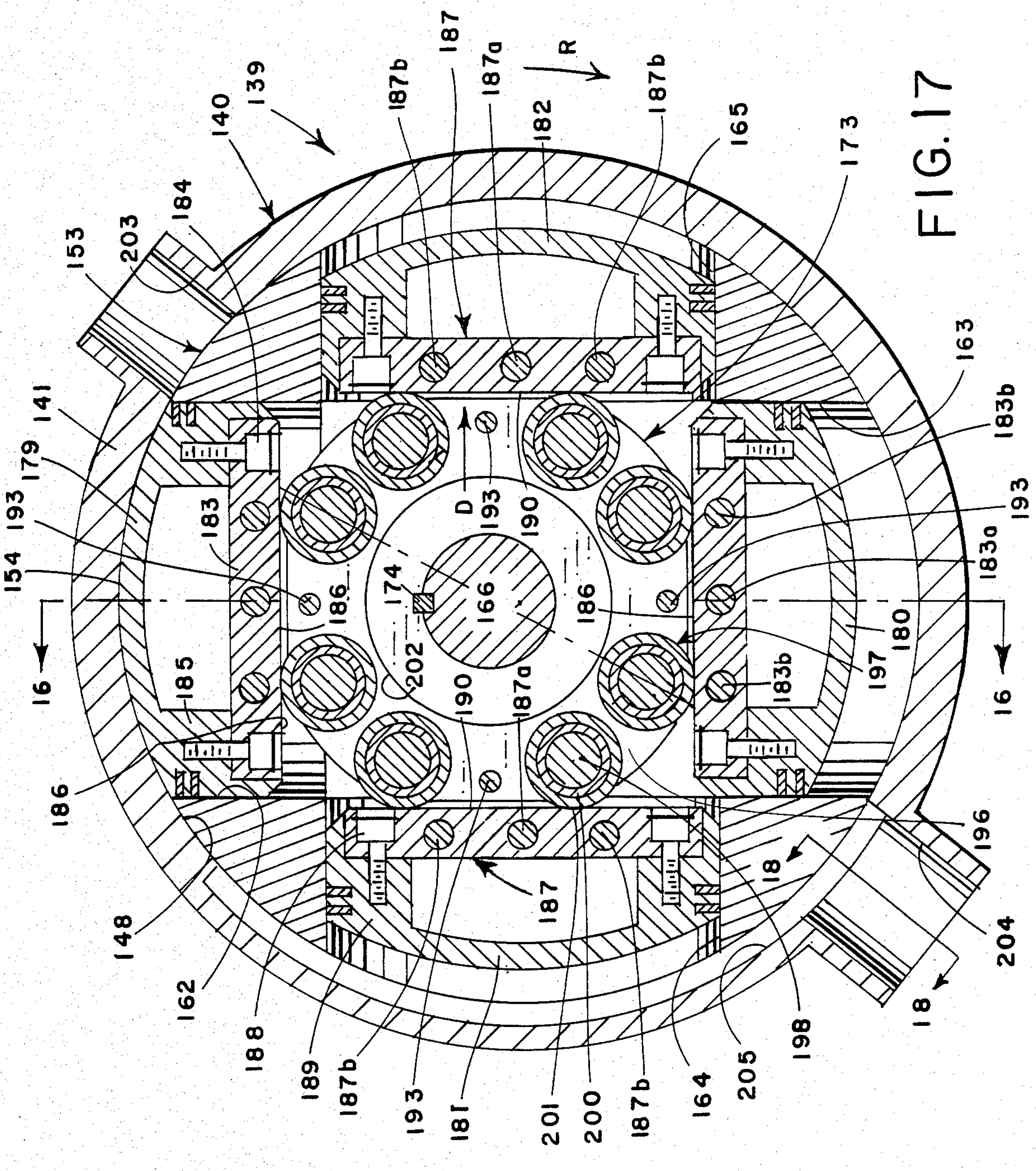
FIG. 17 is a cross sectional view taken along the lines 17—17 in FIG. 16.

As clearly seen in FIGS. 16 and 17, the engine 139 has a stationary housing 140 made of three (3) pieces; a cylindrical center portion 141, and, as seen in FIG. 16, a left and a right annular wall, 142 and 143 respectively. The left and right end walls 142 and 143 are conventionally secured to the center portion 141 as by a plurality of bolts (not shown); there being an annular groove 144 formed in the left end wall and an annular groove 145 formed in the right end wall which securely and sealingly receive the center portion 141. The cylindrical center portion 141 has a cylindrical internal wall 148.

Formed centrally of the end walls 142 and 143, respectively, are annular shoulders 146 and 147; the shoulder 146 having a peripheral cylindrical surface 149 formed coaxially with the internal wall 148 and the shoulder 147 having a peripheral cylindrical surface 150 also formed coaxially with the internal wall 148. Mounted on the shoulder 146 is a bearing assembly 151 and mounted on the shoulder 147 is the bearing assembly 152.

A one piece cylinder block 153 is rotatably mounted in the housing 140. More particularly, the cylinder block 153 has a cylindrical peripheral surface 154 which is closely received in the cylindrical center central member 141 with the peripheral surface 154 closely spaced to the internal cylindrical wall surface 148 of the housing 140. The cylinder block 153 has an annular or cylindrical bore 154 formed axially therethrough (see FIG. 16) and at each end of the bore 155 is a counterbore (see FIG. 16). More particularly, at the left end of the bore 155 is a counterbore 156 which receives the outer race of the bearing assembly 151 and at the right end of the bore 155 is a counterbore 157 which receives the outer race of the bearing assembly 152. Thus, the cylinder block 153 is mounted for rotation about an axis which is coaxial with the axis of the cylinder wall 148 of the housing 140. The left and right side walls 158 and 159, respectively, of the block 153 peripheral of the bearings 151 and 152, slidingly and sealingly engage the adjacent inner surfaces 160 and 161, respectively, of the left and right end walls 142 and 143.

The cylinder block 153 has two (2) paris of diametrically opposed piston chambers or cylinders formed therein. As seen in FIGS. 16 and 17, the block 153 has a first pair of diametrically opposed upper cylinder 162 and lower cylinder 163; and, as seen in FIG. 17, a second pair of diametrically opposed right and left cylinders; the left cylinder being shown at 164 and the right cylinder being shown at 165. It should be understood that the terms upper, lower, left and right are used herein merely for ease of description, for as the engine 139 operates, the cylinder block 153 rotates and the position of the cylinders changes from that shown in FIGS. 1 and 2. The cylinders 162, 163, 164 and 165 extend from the periphery of the block 153 and open into the central cylindrical bore 155. While in FIG. 17, it appears, at first glance, as though the cylinder block 153 is cut into four (4) segments and in FIG. 16 it appears that the block 153 is cut into two (2) lateral segments, one skilled in the art can readily understand that such is not the case and that the cylinder block 153 is a cylinder with four (4) piston chambers therein and a central cylindrical bore.

Refering to FIG. 16, an output shaft 166 extends across the engine 139 and extends out of the end walls 142 and 143, with the axis of rotation of the shaft 166 being above (eccentric) with respect to the axis of rotation of the cylinder block 153. The end walls 142 and 143 respectively have aligned openings 167 and 168, which respectively have bushings 169 and 170 therein, which openings and bushings rotatably mount the shaft 166. At the outer ends of the openings 167 and 168 respectively are seals 171 and 172 which rotatably seal against the periphery of the shaft 166. Securedly mounted on the center of the output shaft 166 is a square cam 173 which is secured against rotation relative to the shaft 166 by a driving key 174 (see FIG. 17), which is conventionally received in mating grooves in the shaft and cam. The cam 173 will be more fully described hereinafter.

Projecting inwardly from the end walls 142 and 143 respectively are annular bosses 175 and 176, respectively, the bosses having the previously referred to central bushed bores 167 and 168 therein coaxial with and rotatably mounting the shaft 166. The inner end of the boss 175 abuttingly engages for relative rotation the left outer surface of a left outer bridle ring 177 while the inner end of the boss 176 abuttingly engages for relative rotation the right outer surface of a right outer bridle ring 178; the bridle rings 177 and 178 will be more fully discussed hereinafter.

Refering to FIGS. 16, 17, 19 and 20, disposed in the cylinders 162, 163, 164 and 165 respectively is a piston 179, 180, 181, and 182; each piston being generally cup-shaped and concave when viewed from the center of the engine outwardly. Refering to upper piston 179 as being illustrative of upper and lower pistons 179 and 180, a relatively wide (see FIG. 20) engagement plate 183 is secured across the opening at the radially inward end of the piston by a pair of diametrically opposed bolts 184 which extend through the plate 183 and are threaded into diametrically opposed bosses 185 formed within the piston 179; the radially inner surface 186 of the plate being a roller engaging surface as more fully described hereinafter.

Figure 22:
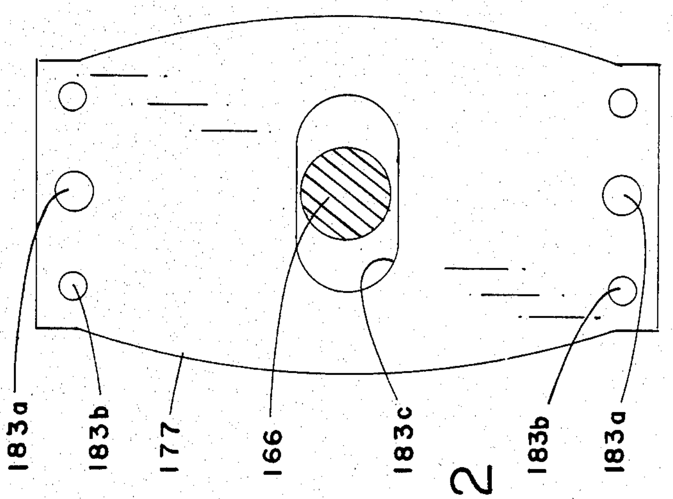
FIG. 22 is a view of the outer bridle ring taken along the lines 22—22 in FIG. 16.
Figure 20:
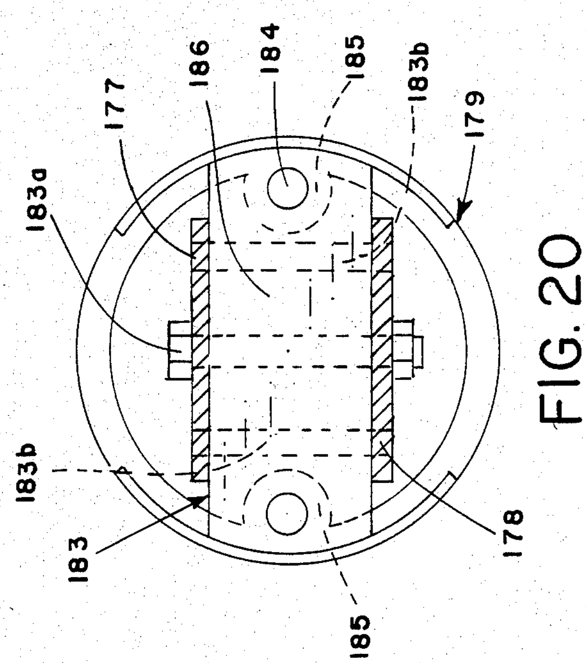
FIG. 20 is a bottom view of one of the pistons shown in FIG. 16 when viewed in direction of the arrow C.

As seen in FIG. 16, and also in FIG. 20, secured to the lateral sides of the plates 183 of pistons 179 and 180 are the left and right outer bridle rings 177 and 178; which rings connect the pistons 179 and 180 for unitary reciprocal movement. The securement is by a bolt and nut assembly 183*a* passing through the bridle rings and each plate 183. As seen in FIGS. 22 and 20, a pair of dowel pins 183*b* spaced laterally on each side of the bolts 183*a* pass through the outer bridle rings and the engagement plate to further secure the bridle rings thereto. The bridle rings 177 and 178 have a central elongated opening 183*c* for receiving the output shaft 166; the opening 183*c* being elongated since the bridle rings with their connecting pistons will move relative to the output shaft during reciprocal and eccentric movement of the pistons and the output shaft. Additionally, the opening 183*c* is for the purpose of lightening the rings 177 and 178.

Refering to FIGS. 21 and also 17, a narrow engagement plate 187 is secured across the opening at the radially inward end of the pistons 181 and 182 by a pair of diametrically opposed bolts 188 which extend through the plate 187 and are threaded into diametrically opposed bosses 189 formed within the pistons 181 and 182; the radially inner surface 190 of the plates being a roller engaging surface as more fully described hereinafter.

Figure 21:
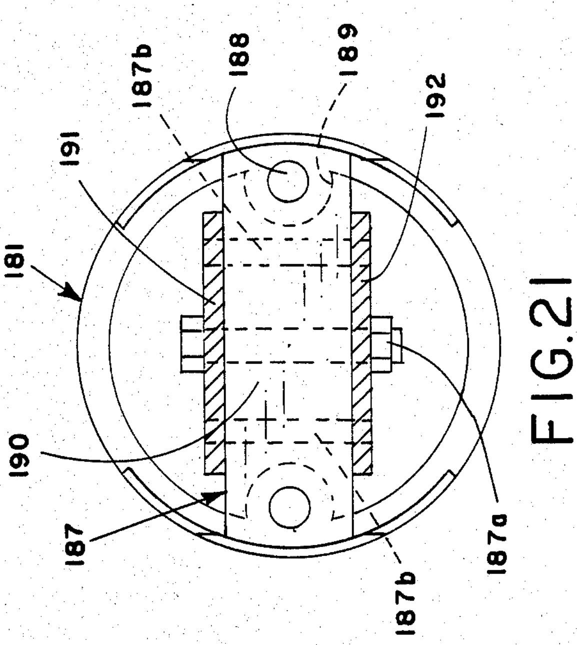
FIG. 21 is a bottom view of a piston disposed ninety (90) degrees from the piston shown in FIG. 16 when viewed in the direction of the arrow D in FIG. 17.
Figure 19:
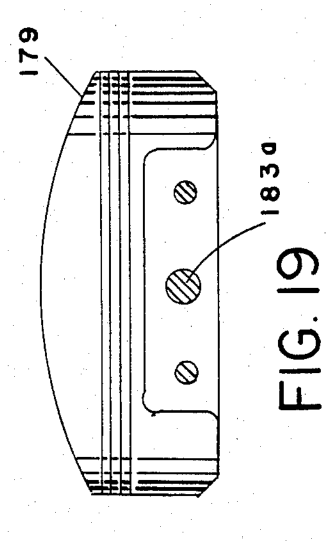
FIG. 19 is a side elevational view of one of the pistons used in the embodiment of FIG. 16.

As seen in FIG. 21 and also FIG. 16, secured to the lateral sides of the narrow plates 187 are the left and right inner bridle rings, 191 and 192 respectively. The inner bridle rings connect the pistons 181 and 182 for unitary reciprocal movement. The rings 191 and 192 are secured to the pistons 181 and 182 by a bolt and nut assembly 187*a* passing through the bridle rings and each of the end plates 187. As seen in FIG. 17, a pair of dowel pins 187*b* spaced laterally on each side of the bolts 187*a* pass through the inner bridle rings (not seen in FIG. 17) and the engagement plate 187 to further secure the bridle rings thereto. The inner bridle rings 191 and 192 have a central elongated opening 187*c* for receiving the output shaft 166; the opening 187*c* being elongated to lighten the bridle ring, and since the bridle rings 191 and 192 with their connecting pistons 181 and 182 will move relative to the output shaft during reciprocal and eccentric movement of the pistons and the output shaft, the opening must be elongated to accommodate such movement. The inner bridle rings 191 and 192 look exactly like the bridle ring 177, as seen in FIG. 22, but are disposed ninety (90) degrees with respect thereto. Additionally, since the plate 187 is narrower than the engagement plate 183, the bridle rings 191 and 192 will lie laterally inwardly of the outer rings 177 and 178 and slidingly abut the outer sides of the cam 173.

The square cam 173, as seen in FIG. 17, is actually constructed as a round-cornered square for weight reduction purposes. As seen in FIG. 16, the cam 173 is divided laterally into two (2) halves, a left half 173*a* and a right half 173*b*, with the two (2) halves being secured together by four (4) bolts 193 as shown in FIG. 17.

As seen in FIG. 16, the cam 173 is provided with a peripheral annular groove 194 having a left and a right annular side wall 195 and 196 respectively. Received in the annular groove 194 are four (4) pair of roller assemblies 197, with one (1) pair being disposed radially inwardly of each piston 179, 180, 181 and 182 and rollingly engaging the inner surfaces 186 of the plate 183 and the inner surfaces 190 of the plates 187; a pair of roller assemblies engaging each of the inner surfaces 186 and 190.

As seen in FIGS. 16 and 17, each of the roller assemblies include a central axially extending mounting pin 198, which has its opposed ends pressed into registering openings 199 formed in the side walls 195 and 196, an annular bearing assembly 200 (see FIG. 17) mounted on each mounting pin 198, and a hardened roller 201 rollingly mounted on each bearing assembly; the bottom of the rollers 201 being spaced from the bottom 202 of the groove 194 while the radially outer surface of the rollers 201 engaging either the lower surface 186 or 190 of engagement plate 183 or 187 respectively. The rollers 201 of the roller assemblies 197 by cooperatively rollingly engaging the engagement plates 183 and 187 allow the plates to move between their central position, which the plates occupy when the pistons are in their upward and downward position as seen in FIGS. 16 and 17 and their downward position as seen in FIG. 17 when the plates are lower relative to the square cam as seen with respect to the left and right pistons as seen in FIG. 17.

Since the roller assemblies are secured to the cam and recessed thereinto, they provide for a low inertia, compact structure. Since the pistons 179–181 engage the rollers of the square cam and are held in such engagement by the bridle rings 177, 178, 191 and 192, the pistons rotate unitarily with the cam upon imposing a driving force thereto, and with the pistons being in the cylinder block 153, the cylinder block rotates unitarily with the output shaft 166, while the latter rotates eccentrically relative to the housing and cylinder block.

Figure 18:
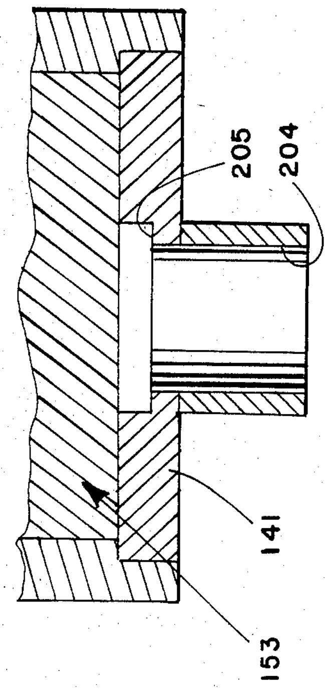
FIG. 18 is a fragmentary cross sectional view taken along the lines 18—18 in FIG. 17.

An inlet port 203 is disposed in the cylindrical central member 141 of the housing 140, as viewed in FIG. 17, to the right (clockwise) of the upper piston 179, the direction of rotation of the cylinder block 153 and drive shaft 166 being shown by the arrow R in FIG. 17. An exhaust port 204 is also disposed in the central member 141 and being disposed to the left (see FIG. 17) of the lower piston 180. Formed in the central member 141 is an exhaust channel extender 205 which is confluent with the exhaust port 204 and extends clockwise therefrom approximately one hundred twenty (120) degrees to provide for exhaust over an extended portion. As seen in FIG. 18, the exhaust channel 205 is confluent with the port 204, is formed in the central member 141 while being substantially narrower than the central member 141, so that the cylindrical periphery of the cylinder block 153 can seal thereabout and only the cylinders, as seen in FIG. 17, can become confluent with the port 204 and channel 205.

A starter is desired to commence clockwise rotation of the cylinder block 153 and shaft 166 as viewed in FIG. 17. When the piston 179 reaches the inlet port 203, pressurized Freon enters the cylinder 162 and forces piston 179 downwardly, which, in a well known manner, causes the piston and the rotating cylinder to drive the output shaft. When the piston reaches the exhaust port 204 and channel 205, Freon is exhausted and continues to be exhausted until such time as the piston moves past the channel 205. Each of the pistons 180, 181 and 182, follow piston 179 in its operation to thereby drive the output shaft 166 relative to the housing 140.

Various alternatives and modifications may be made in the devices above-described without departing from the spirit of this invention.

What is claimed is:

1. An engine comprising, a housing having a central axis, a cylinder block rotatably mounted in said housing for rotation coaxially with said housing axis, said cylinder block having an axially extending opening therein, an output shaft having an inner end disposed in said axially extending opening and an outer end extending axially from said housing, said output shaft having an axis of rotation disposed eccentrically with respect to the axis of rotation of said cylinder block, at least a first and a second pair of diametrically opposed generally radially extending piston-receiving cylinders disposed in said cylinder block with said first pair being circumferentially and equidistantly spaced from said second pair, a piston slideably and sealingly mounted in each of said piston cylinders, abutment means carried by the radially inner ends of said pistons, a pair of piston joining members in the form of a pair of bridle rings secured to the abutment means of each pair of diametrically opposed pistons for insuring that the pistons disposed in each pair of cylinders reciprocate in unison, a square cam means carried by said output shaft and rotatable unitarily therewith and disposed at a location intermediate said pistons, axially extending roller means carried by said cam means and engaged by the abutment means on the inner end of said pistons, said roller means being partially disposed below the surface of said cam means so as to only partially extend therefrom and including axially extending maintaining means mounting said roller means for rotation and preventing other movement of said roller means, and there being four of said roller means mounted for rotation in semicircular grooves in corner portions of said square cam, whereby a compact and low inertia structure is obtained, and spaced first intake and exhaust ports positioned to be alternately confluent with the outer ends of said pistons for alternately charging and exhausting the area outwardly of said piston and imposing a load upon said cam means for causing rotation of said output shaft and said cylinder block.

2. An engine according to claim 1 wherein each of said roller means comprises a pair of axially spaced rollers, with two pair of said axially spaced rollers being rotatably mounted on each of said axially extending maintaining means.

3. An engine according to claim 1 wherein means seal both the inner and outer ends of each of said cylinder means, the piston disposed in each of said cylinder means includes projecting means sealingly and reciprocally projecting through the means sealing the inner ends of said cylinder means, said abutment means being carried by said projecting means, and also including spaced second intake and exhaust ports confluent with the inner ends of said pistons for alternately charging and exhausting the area inwardly of said pistons, said second intake and exhaust ports being spaced approximately one hundred eighty degrees respectively from said first intake and exhaust ports so that said pistons are double acting, and said first and second intake and exhaust ports being formed in an axial end face of the engine.

4. An engine according to claim 1 wherein each of said roller means comprises a pair of axially spaced rollers, with two pair of said axially spaced rollers being rotatably mounted on each of said axially extending maintaining means.

5. An engine according to claim 4 wherein the abutment means on one pair of opposed pistons abuts the axially outer of said rollers and the abutment means on the other pair of said opposed pistons abuts the axially inner of said rollers, whereby two pistons engage the roller means on each maintaining means.

6. An engine comprising in combination, a housing having a central axis, a cylinder block rotatably mounted in said housing for rotation coaxially with said housing axis, said cylinder block having an axially extending opening therein, an output shaft having an inner end disposed in said axially extending opening and an outer end extending axially from said housing and being rotatably mounted therein, said output shaft having an axis of rotation disposed eccentrically with respect to the axis of rotation of said cylinder block, at least a first and a second pair of diametrically opposed generally radially extending piston-receiving cylinders disposed in said cylinder block with said first pair being circumferentially and equidistantly spaced from said second pair, a piston slideably and sealingly mounted in each of said piston cylinders, abutment means carried by the radially inner ends of said pistons, a pair of piston joining members in the form of bridle rings secured to the abutment means of each pair of diametrically opposed pistons for insuring that the pistons disposed in each pair of cylinders reciprocate in unison, a square cam means carried by said output shaft and rotatable unitarily therewith and disposed at a location intermediate said pistons, a plurality of pairs of axially extending circumferentially spaced roller means with a pair of said circumferentially spaced roller means engaging said abutment means of each of said pistons, said roller means being partially disposed below the surface of said cam means so as to only partially extend therefrom and including axially extending maintaining means mounting said roller means for rotation and preventing other movement of said roller means, and there being four of said roller means mounted for rotation in semicircular grooves in corner portions of said square cam, whereby a compact and low inertia structure is attained, and spaced first intake and exhaust ports positioned to be alternately confluent with the outer ends of said pistons for alternately charging and exhausting the area outwardly of said pistons and imposing a load upon said cam means for causing rotation of said output shaft and said cylinder block.

7. An engine according to claim 6 wherein said cam means includes axially spaced shoulder means disposed on opposed axial sides of said roller means with the axial ends of said maintaining means being secured in said shoulder means.

8. An engine according to claim 6, wherein means seal both the inner and outer ends of each of said cylinder means, a piston disposed in each of said cylinder means includes projecting means sealingly and reciprocally projecting through the means sealing the inner ends of said cylinder means, said abutment means being carried by said projecting means, and also including spaced second intake and exhaust ports confluent with the inner ends of said pistons for alternately charging and exhausting the area inwardly of said pistons, said second intake and exhaust ports being spaced approximately one hundred eighty degrees respectively from said first intake and exhaust ports so that said pistons are double acting, and said first and second intake and exhaust ports being formed in an axial end face of said engine.

* * * * *